(12) United States Patent
Birkelund

(10) Patent No.: US 10,197,314 B2
(45) Date of Patent: Feb. 5, 2019

(54) ELECTRONIC EXPANSION VALVE AND METHODS FOR CALIBRATING AN ELECTRONIC EXPANSION VALVE

(71) Applicant: Danfoss A/S, Nordborg (DK)

(72) Inventor: Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 32 days.

(21) Appl. No.: 15/303,304

(22) PCT Filed: May 20, 2015

(86) PCT No.: PCT/EP2015/061059
§ 371 (c)(1),
(2) Date: Oct. 11, 2016

(87) PCT Pub. No.: WO2015/185356
PCT Pub. Date: Dec. 10, 2015

(65) Prior Publication Data
US 2017/0122631 A1    May 4, 2017

(30) Foreign Application Priority Data
Jun. 4, 2014    (EP) .................................... 14171191

(51) Int. Cl.
*F25B 41/06* (2006.01)
*F16K 31/06* (2006.01)
*F16K 37/00* (2006.01)

(52) U.S. Cl.
CPC ........ *F25B 41/062* (2013.01); *F16K 31/0644* (2013.01); *F16K 31/0651* (2013.01);
(Continued)

(58) Field of Classification Search
CPC ...... F25D 31/002; F25D 17/02; F25B 49/022; F25B 41/062; F16L 31/0655; F16K 31/0644; F16K 37/0083; H01F 7/1607
(Continued)

(56) References Cited

U.S. PATENT DOCUMENTS 3,529,806 A    9/1970  Kozel
4,459,819 A *  7/1984  Hargraves ............. F25B 41/062
                                               251/129.08
(Continued)

FOREIGN PATENT DOCUMENTS

JP    H1089523 A    4/1998
JP    2848812 B2    1/1999
(Continued)

OTHER PUBLICATIONS

International Search Report for PCT Serial No. PCT/EP2015/061059 dated Jul. 27, 2015.

*Primary Examiner* — Melvin Jones
(74) *Attorney, Agent, or Firm* — McCormick, Paulding & Huber LLP

(57) ABSTRACT

An electronic expansion valve (1) is provided, comprising an inlet (9), an outlet (8), an armature (2), a stop member (3), a biasing member (4) and a solenoid coil (12). The biasing member (4) provides a biasing force on the armature (2) towards a closing direction while the solenoid coil (12) may be provided with a current to provide a magnetic force on the armature (2) towards an opening direction. It is intended to provide an electronic expansion valve that may be controlled more precisely and has a higher safety. To this end the pressure difference between the inlet pressure and the outlet pressure provides a differential pressure force on the armature (2) towards an opening direction to allow a fluid flow from the inlet (9) to the outlet (8), and furthermore the armature (2) is displaced away from the stop member (3) to
(Continued)

allow a fluid flow from the inlet (9) to the outlet (8) if the sum of the magnetic force and the differential pressure force on the armature (2) exceeds the biasing force. The invention furthermore relates to a refrigeration system comprising such an electronic expansion valve as well as a method for calibrating such an electronic expansion valve.

21 Claims, 4 Drawing Sheets

(52) U.S. Cl.
CPC ...... *F16K 31/0655* (2013.01); *F16K 37/0083* (2013.01); *F25B 2600/2513* (2013.01); *F25B 2600/2525* (2013.01)

(58) Field of Classification Search
USPC .......... 62/210, 222, 511, 527, 528; 137/510, 137/906; 251/129.05
See application file for complete search history.

(56) References Cited

U.S. PATENT DOCUMENTS

| | | | |
|---|---|---|---|
| 4,763,841 A | 8/1988 | Hafner et al. | |
| 5,544,857 A * | 8/1996 | Torrence | F16K 3/265 251/129.15 |
| 5,715,704 A * | 2/1998 | Cholkeri | F16K 31/0651 137/513.3 |
| 6,182,457 B1 | 2/2001 | Enderle | |
| 6,374,624 B1 | 4/2002 | Cholkeri et al. | |
| 8,307,846 B2 | 11/2012 | Yanagisawa et al. | |
| 2003/0146402 A1* | 8/2003 | Hirota | F16K 1/123 251/129.08 |
| 2004/0079811 A1* | 4/2004 | Matsuda | F16K 31/42 236/92 B |
| 2005/0056050 A1 | 3/2005 | Hirota | |
| 2005/0060034 A1* | 3/2005 | Berry | A61F 2/44 623/17.11 |
| 2005/0097920 A1* | 5/2005 | Ezaki | F25B 41/062 62/527 |
| 2005/0126218 A1* | 6/2005 | Sohn | F25B 41/04 62/527 |
| 2009/0179164 A1* | 7/2009 | Higashidozono | F04B 27/1804 251/129.03 |

FOREIGN PATENT DOCUMENTS

| | | |
|---|---|---|
| JP | H11316068 A | 11/1999 |
| RU | 2432531 C2 | 10/2011 |

* cited by examiner

ELECTRONIC EXPANSION VALVE AND METHODS FOR CALIBRATING AN ELECTRONIC EXPANSION VALVE

CROSS REFERENCE TO RELATED APPLICATION

This application is entitled to the benefit of and incorporates by reference subject matter disclosed in the International Patent Application No. PCT/EP2015/061059 filed on May 20, 2015 and European Patent Application No. 14171191.1 filed on Jun. 4, 2014.

TECHNICAL FIELD

The invention relates to an electronic expansion valve comprising an inlet, an outlet, an armature, a stop member, a biasing member and a solenoid coil, wherein the armature directly or indirectly rests against the stop member in the closed position of the valve, and wherein the biasing member provides a biasing force on the armature towards a closing direction to stop a fluid flow from the inlet to the outlet, and wherein the solenoid coil provides a magnetic force on the armature towards an opening direction to allow a fluid flow from the inlet to the outlet if the solenoid coil is provided with an electric current.

BACKGROUND

The invention furthermore relates to a refrigeration system comprising such an electronic expansion valve.

The invention furthermore relates to a method for calibrating an electronic expansion valve comprising an inlet, an outlet, an armature, a stop member, a biasing member and a solenoid coil, wherein the biasing member provides a biasing force on the armature towards a closing direction to stop a fluid flow from the inlet to the outlet, and wherein the solenoid coil provides a magnetic force on the armature towards an opening direction to allow a fluid flow from the inlet to the outlet if a solenoid coil is provided with an electric current.

Electronic expansion valves are a common component of refrigeration or air conditioning systems. A basic refrigeration cycle contains a compressor, a condenser, an expansion valve (for example an electronic expansion valve) and an evaporator. In the usually closed cycle a refrigerant is first introduced into the compressor as a low temperature, low pressure gas. The compressor compresses the refrigerant to a high temperature, high pressure gas that is guided to the condenser. In the condenser, the high temperature, high pressure gas condenses to a high pressure liquid form of the refrigerant, whereby heat is transferred to the ambient environment.

Note that some refrigerants like $CO_2$ may not condense in the condenser depending on the pressure and the external temperature. In this case the condenser may be operated as a gas cooler.

The high pressure fluid then arrives at the expansion valve, that limits the flow of fluid to the subsequently arranged evaporator. The expansion valve limits the flow such that the pressure of the fluid in the evaporator stays low and thereby allows the fluid to evaporate back to the gaseous phase, thereby absorbing heat from the ambient environment.

Consequently, it is critical for the effectiveness of the refrigeration cycle that the flow of the fluid through the expansion valve to the evaporator can be controlled with a high precision. To this end, it is for example known to use temperature or pressure sensors to adjust the opening or closing cycles of the expansion valve accordingly.

Afterwards, the low pressure gas exits the evaporator and is fed back into the compressor whereby the refrigeration cycle starts anew.

An electronic expansion valve of the kind mentioned at the outside as well as a corresponding refrigeration system is, for example, known from U.S. Pat. No. 6,374,624 B1. The expansion valve disclosed therein comprises a cylindrical armature that is urged towards a stop member by a spring force of a spring in the direction towards the outlet of the expansion valve. The expansion valve furthermore comprises a fixed core that additionally acts as a flow restrictor. By activating the solenoid coil a magnetic force acts upon the armature, moving the armature away from the stop member thereby opening the expansion valve against the force of the spring as well as the force of the differential fluid pressure. Such a solution has the disadvantage that in order to allow the expansion valve to open even at a large pressure difference between the inlet and the outlet, the magnetic force provided by the solenoid coil on the armature must be chosen rather large. Consequently, the expansion valve may only be controlled between a completely closed and a completely open position.

A further electronic expansion valve is known from JP H1089523. In this case a spring force urges the armature towards an opening position of the electronic expansion valve in case the solenoid coil is not provided with a current. When activating the solenoid coil the armature is displaced by the magnetic force towards the inlet. Depending on the strength of the current and the resulting magnetic force the armature may close one or several fluid paths in a nozzle, thereby reducing the fluid flow through the valve. The electronic expansion valve may however not be fully closed as a central orifice will remain open even at full displacement of the armature.

This solution allows for a more precise control of the fluid flow within a certain range, it does however not permit to fully close the valve. Consequently, the applications are limited.

SUMMARY

The object underlying the present invention is therefore to provide an electronic expansion valve that allows for a better control and a wider range of applications.

According to the invention the above mentioned task is solved in an electronic expansion valve of the type mentioned at the outset in that the pressure difference between the inlet pressure and the outlet pressure provides a differential pressure force on the armature towards an opening direction to allow a fluid flow from the inlet to the outlet, and wherein the armature is displaced away from the stop member to allow a fluid flow from the inlet to the outlet if the sum of the magnetic force and the differential pressure force on the armature exceeds the biasing force.

The pressure on the inlet side will generally be larger than on the outlet side in an expansion valve. According to the invention the armature is arranged in such a way, that the pressure difference between the inlet and the outlet will provide a differential pressure force on the armature towards an opening direction of the valve, for example in contrast to U.S. Pat. No. 6,374,624 B1. Since the pressure on the outlet side (the pressure corresponding to the pressure in the evaporator) is known, the electronic expansion valve may therefore be calibrated to control the pressure difference over the valve by controlling the current to the solenoid coil. This is particularly advantageous if the electronic expansion valve is used with $CO_2$ as a refrigerant. Since the pressure difference over the valve can be controlled, this allows to dispense with an otherwise necessary pressure sensor or pressure transmitter.

Furthermore, such an electronic expansion valve may also provide an improved safety, since the electronic expansion valve can be calibrated to open if the differential pressure force exceeds a certain safety value even if the solenoid coil is not provided with a current. In this case, the electronic expansion valve will also act as a pressure relief valve.

The biasing member may preferably be spring providing a spring force.

It is preferred that the electronic expansion valve is at least partially arranged in a tube coaxially to a central tube axis. In this case one may dispense with a separate housing for the electronic expansion valve. In this case the armature, the stop member as well as the biasing member may be arranged inside the tube while the solenoid coil may be arranged coaxially around a section of the tube. This embodiment reduces production costs and allows for a more compact construction of the valve.

In a preferred embodiment a throttling element is arranged between the armature and the stop member. This way one may use a different material for the throttling element than for the armature, which may be preferable because the armature needs to be magnetisable. In this case the throttling element may, for example, be made from a material with a reduced friction, e.g. Teflon or the like. The throttling element may close or throttle an orifice of the valve in order to prevent or limit the fluid flow through the valve. In this embodiment the armature only indirectly rests against the stop member in the fully closed position of the electronic expansion valve.

In a further preferred embodiment the throttling element comprises a throttling cone that engages with the stop member in the closed position of the valve. Providing the throttling element with a throttling cone allows for a better control of the fluid flow during the opening of the electronic expansion valve. In particular, the throttling cone may allow to slowly increase the resulting fluid flow through the electronic expansion valve by increasing the current to the solenoid coil.

In a preferred embodiment the throttling cone comprises a cylindrical base and a frusto-conical tip. This way the cylindrical base may rest against the valve seat in the fully closed position of the electronic expansion valve while the frusto-conical tip engages into an orifice, e.g. of the stop member. Such a shape of the throttling cone ensures a tight closure of the electronic expansion valve in the fully closed position since the contact surface of the throttling element with the stop member may be increased.

In a further preferred embodiment the throttling element comprises a cylindrical cap that is arranged in a cylindrical bore of the armature. In this case one or several apertures may be arranged in the throttling element, in particular in the base of the cap. Preferably, the apertures may be arranged offset from a central axis of the cylindrical cap which may coincide with a central cylindrical axis of the electronic expansion valve. In case the throttling element also comprises a throttling cone the apertures may be arranged around the throttling cone on a circle in the base of the cylindrical cap. Preferably the cap is open on the side facing the inlet. This way the throttling element will be held in the cylindrical bore by the differential pressure force.

In a preferred embodiment the throttling element is arranged in the armature with radial clearance. In other words, there is a circumferential gap between the throttling element and the armature or the cylindrical bore of the armature providing a play. This means that the throttling element can be accommodated within the armature without regarding tight tolerances.

It is preferred that the stop member comprises an orifice with a valve seat as well as an orifice channel, wherein the orifice channel is arranged between the inlet and the orifice in the direction of fluid flow. This way the stop member may be used to restrict the fluid flow already before the fluid flow arrives at the orifice. Preferably, the orifice channel is arranged in the center of the stop member. Preferably, the diameter of the orifice channel is larger at the end facing the inlet than on the end facing the outlet.

Preferably the throttling element is guided by the stop member so that the throttling cone is moveable frictionless within the orifice. The stop member guiding the throttling element always keeps a small gap between the throttling element, more precisely the frusto-conical tip of the throttling element, and the wall of the orifice. Therefore, wear can be avoided.

In a further preferred embodiment the orifice channel comprises at least one converging section, which converges towards the orifice. The orifice channel may, for example, comprise one or two cylindrical sections as well as one or two frusto-conical sections converging towards a smaller cross-section of the orifice channel. Preferably, the orifice channel comprises two cylindrical sections and two converging sections. Preferably, one of the converging sections is arranged directly adjacent to the orifice.

In a further preferred embodiment the electronic expansion valve does not include a fixed magnetic core. In this case, the magnetic force on the armature provided by the solenoid coil will generally be lower compared to the case when a fixed magnetic core is included in addition to the armature. On the other hand this allows to increase the length of the armature to extend through the majority of the solenoid coil. This allows to better control the position of the armature by controlling the current provided to the solenoid coil. This is particularly preferable if the electronic expansion valve is used as a proportional valve. Omitting a fixed magnetic core also simplifies a calibration of the electronic expansion valve since the number of components, for which a correct position needs to be determined is reduced.

The above mentioned task is also solved by a refrigeration system comprising the electronic expansion valve according to any of the disclosed embodiments. Preferably the refrigeration system uses $CO_2$ as a refrigerant. In this case an otherwise necessary pressure sensor in the condenser may be omitted because the electronic expansion valve according to the invention allows to control the differential pressure over the valve.

The above mentioned task is also solved by a method for calibrating an electronic expansion valve comprising an inlet, an outlet, an armature, a stop member, a biasing member and a solenoid coil, wherein the biasing member provides a biasing force on the armature towards a closing direction to stop a fluid flow from the inlet to the outlet, and wherein the solenoid coil provides a magnetic force on the armature towards an opening direction to allow a fluid flow from the inlet to the outlet if the solenoid coil is provided with an electric current, and wherein the pressure difference between the inlet pressure and the outlet pressure provides a differential pressure force on the armature towards an opening direction to allow a fluid flow from the inlet to the outlet, comprising the following steps:

Providing a predetermined emergency fluid pressure difference from inlet to outlet, Adjusting the position of the stop member while measuring the fluid flow rate at the outlet, Once a predetermined emergency fluid flow rate is measured, fixing the position of the stop member.

In order to calibrate an electronic expansion valve according to the invention one may therefore first keep the stop member displaceable. By displacing the stop member, the force of the biasing member (e.g. the spring) in the closed position of the armature is varied. As a first step an emergency fluid pressure difference is provided from inlet to outlet. Then the position of the stop member in the valve housing or the tube is adjusted while the resulting fluid flow rate at the outlet of the electronic expansion valve is measured. Once a desired fluid flow rate is measured at the outlet the correct position of the stop member is found. In this position the stop member is fixed the valve housing or the tube.

Using the above described calibration method for the electronic expansion valve ensures that the electronic expansion valve will include the functionality of a pressure relief valve. For example, the emergency pressure may be a maximum pressure above which the electronic expansion valve or a connected refrigeration system may not be operated safely. Furthermore, it is then also ensured that the electronic expansion valve will relief a too large pressure difference between the inlet and the outlet even in case that the solenoid coil or a connected controller has a malfunction. The magnitude of the emergency fluid flow rate can be chosen such that the emergency pressure difference is reduced in a controlled manner. Consequently, the safety is improved.

It is preferred if the method includes the following additional steps:

After fixing the position of the stop member, providing a desired fluid pressure difference from inlet to outlet, Providing the solenoid coil with a predetermined current to displace the armature, Adjusting the position of the solenoid coil relative to the stop member while measuring the fluid flow rate at the outlet, Once a desired fluid flow rate is measured, fixing the position of the solenoid coil relative to the stop member.

After the first calibration steps are performed and the stop member is fixed, a desired fluid pressure difference is provided from inlet to outlet. The desired fluid pressure is lower than the emergency fluid pressure provided before. Then a predetermined current is provided to the solenoid coil to displace the armature by the resulting magnetic force. While the solenoid coil is active, the position of the solenoid coil is adjusted relative to the stop member and at the same time the resulting fluid flow rate at the outlet is measured. Once a desired fluid flow rate for the desired fluid pressure difference is found the position of the solenoid coil is fixed relative to the stop member. By these addition steps the calibration of the electronic expansion valve is improved. One may additionally ensure that at a given desired pressure difference from inlet to outlet and a predetermined current to the armature an optimal flow rate through the electronic expansion valve is achieved. The resulting electronic expansion valve has a well calibrated relation between the current provided to the solenoid coil and the resulting fluid flow rate through the expansion valve. Furthermore the differential pressure over the electronic expansion valve may be controlled by controlling the current to the solenoid coil.

It is furthermore preferred if the armature and the stop member are arranged in a tube, wherein the stop member is displaced in the longitudinal direction of the tube before the position of the stop member is fixed relative to the tube. In this embodiment the electronic expansion valve does not require a separate housing, but is arranged in and around a tube. The stop member is then simply displaced along the longitudinal direction of the tube during the calibration.

Preferably the position of the stop member is fixed by plastically deforming the tube around the stop member. This way, the fixing process of the stop member relative to the solenoid coil is simplified. To this end the stop member may preferably comprise an annular recess into which the tube may be deformed.

In a preferred embodiment the solenoid coil is arranged concentrically around the tube, wherein the solenoid coil is displaced in the longitudinal direction of the tube before the position of the solenoid coil is fixed relative to the stop member. This way the solenoid coil may be arranged concentrically around the tube that contains the armature and the stop member. The solenoid coil may then be displaced along the tube during the calibration until the correct position of the solenoid coil is found. Thereby the calibration is simplified and the cost of the valve is reduced.

BRIEF DESCRIPTION OF THE DRAWINGS

A preferred embodiment of the invention will now be described in more detail with reference to the drawings, wherein.

DETAILED DESCRIPTION

Figure 1:
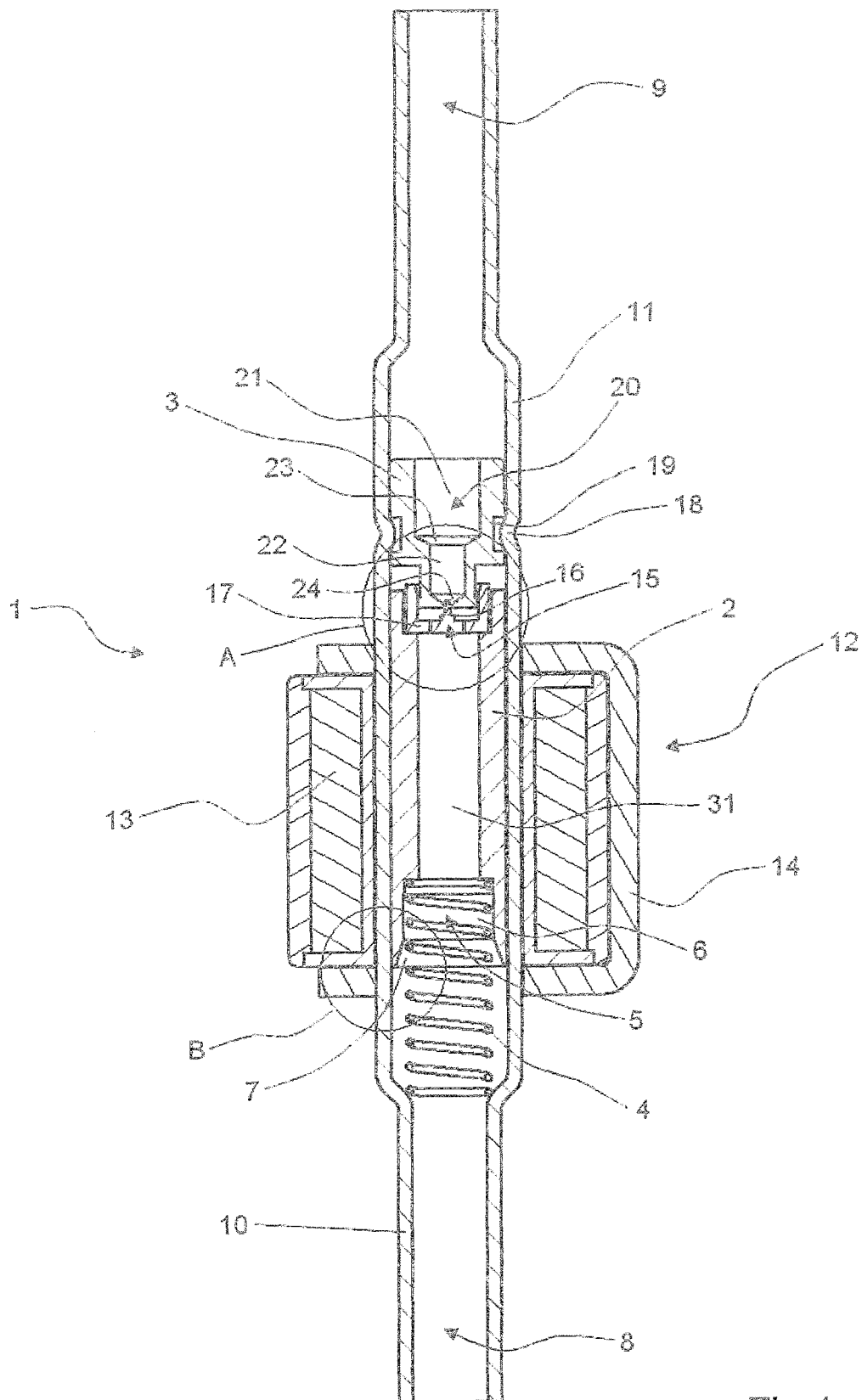
FIG. 1 shows a cross section through an electronic expansion valve according to the invention.

In FIG. 1 a sectional view through an electronic expansion valve 1 according to the invention is shown. The electronic expansion valve 1 comprises an armature 2, a stop member 3, as well as a biasing member 4. The biasing member 4 in this case is a spring. The biasing member 4 engages into an outlet bore 5 of the armature 2. The outlet bore 5 comprises a cylindrical outlet bore section 6 as well as a frusto-conical outlet bore section 7. The frusto-conical outlet bore section 7 is located at the end of the outlet bore 5 facing an outlet 8 of the electronic expansion valve 1.

At the opposite side of the electronic expansion valve 1 an inlet 9 is arranged. In this embodiment both the inlet 9 as well as the outlet 8 are arranged in a common tube 10.

The tube 10 comprises an enlarged section 11 with a larger cross section than the remaining part of the tube 10.

The armature 2, the stop member 3 as well as the biasing member 4 are arranged in the enlarged section 11 of the tube 10. On the outside of the enlarged section 11 a solenoid coil 12 is arranged. The solenoid coil 12 comprises a coil 13 as well as a magnetic bracket 14.

When the solenoid coil 12 is provided with a current a magnetic field is generated that results in a magnetic force on the armature 2 towards an opening direction. At the same time the biasing member 4 provides a biasing force urging the armature 2 towards a closing direction against the stop member 3. Furthermore, a differential pressure force caused by the pressure difference between the inlet 9 and the outlet 8 acts indirectly upon the armature 2 to displace the armature 2 towards an opening direction (in this case in the direction of the outlet 8). If the sum of the magnetic force caused by the solenoid coil 12 and the differential pressure force is larger than the biasing force provided by the biasing member 4 the electronic expansion valve will open. Since the magnetic force provided by the solenoid coil depends on the current provided to the solenoid coil 12, the size of the magnetic force can be adjusted to choose the opening degree of the electronic expansion valve 1. Thereby the fluid flow through the electronic expansion valve 1 can be controlled.

At the end of the armature 2 facing towards the inlet 9 a throttling element 15 is arranged. The throttling element 15 comprises a throttling cone 16 as well as a cylindrical cap 17.

The stop member 3 is fixed to the enlarged section 11 of the tube 10. The enlarged section 11 is deformed at a radial deformation 18 that engages into an annular recess 19 of the stop member 3 thereby fixing the position of the stop member 3 relative to the solenoid coil 12.

The stop member 3 comprises an orifice channel 20 with two cylindrical sections 21, 22, as well as two converging sections 23, 24. The cylindrical section 21 that is closer to the inlet 9 has a larger cross section than the cylindrical section 22 that is closer to the outlet 8. The converging sections 23, 24 both have a frusto-conical shape subsequently reducing the cross section of the orifice channel 20 in the flow direction from the inlet 9 towards the outlet 8.

Figure 2:
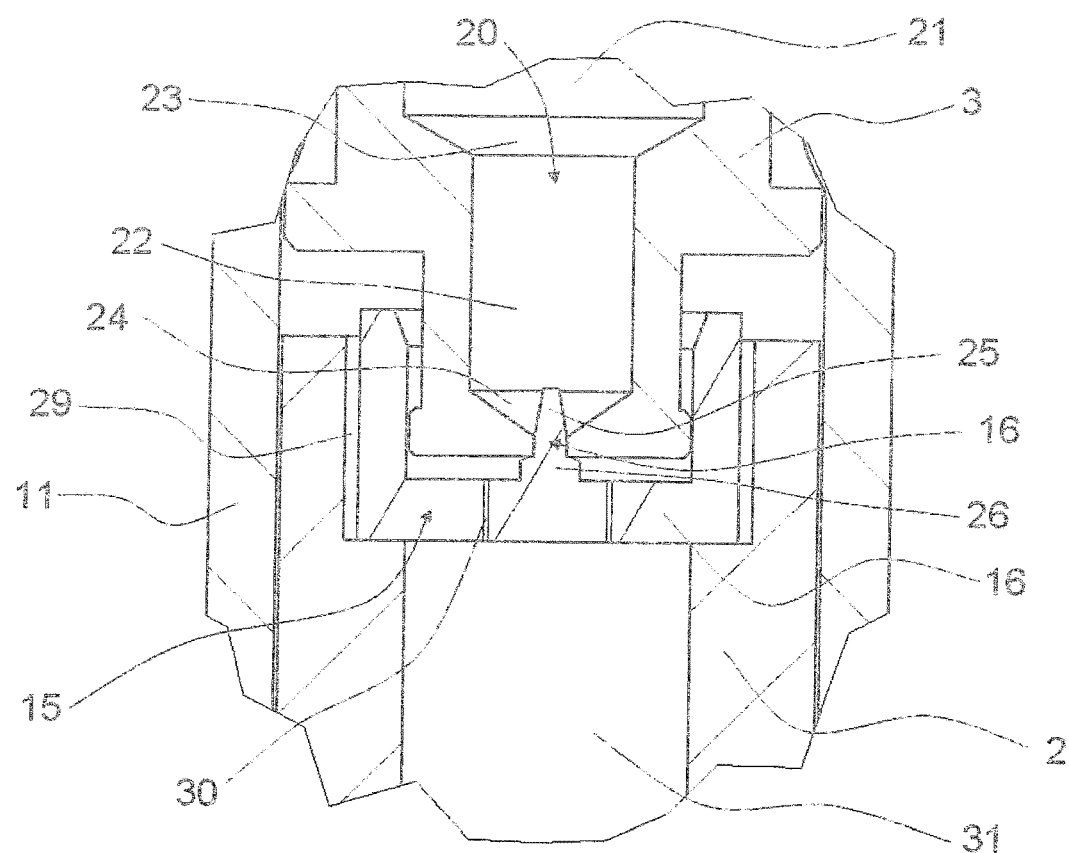
FIG. 2 shows a detail A corresponding to FIG. 1 in the fully closed position of the electronic expansion valve.
Figure 3:
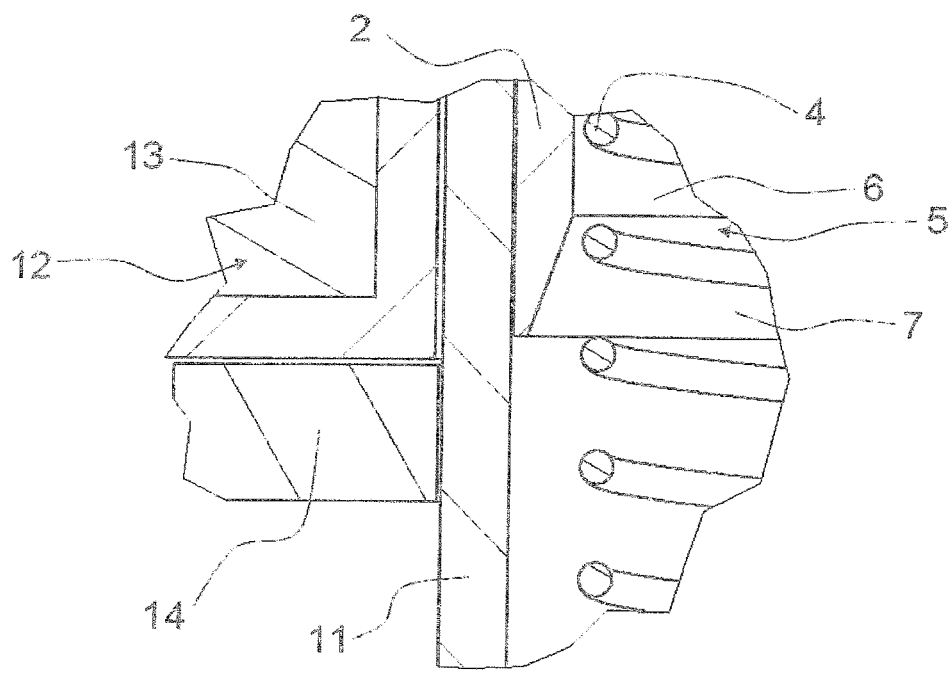
FIG. 3 shows a detail B corresponding to FIG. 1 in the fully closed position of the electronic expansion valve.
Figure 4:
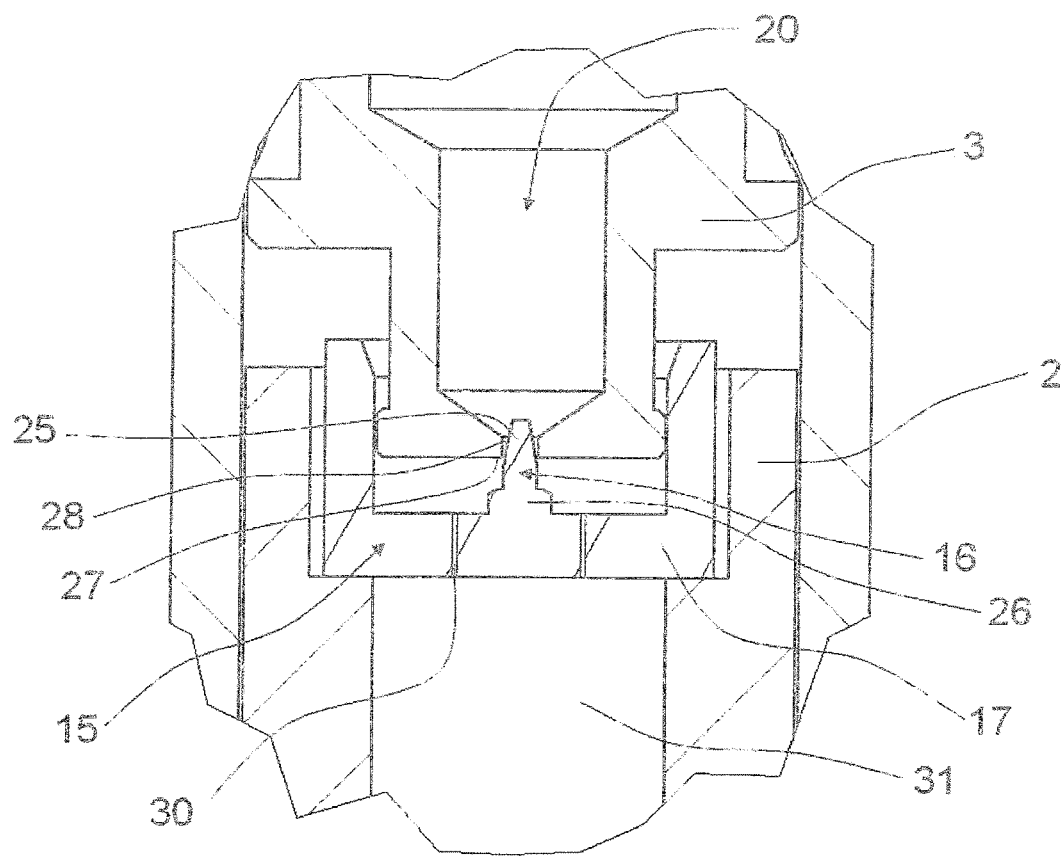
FIG. 4 shows a detail A corresponding to FIG. 1 in a partially opened position of the electronic expansion valve.
Figure 5:
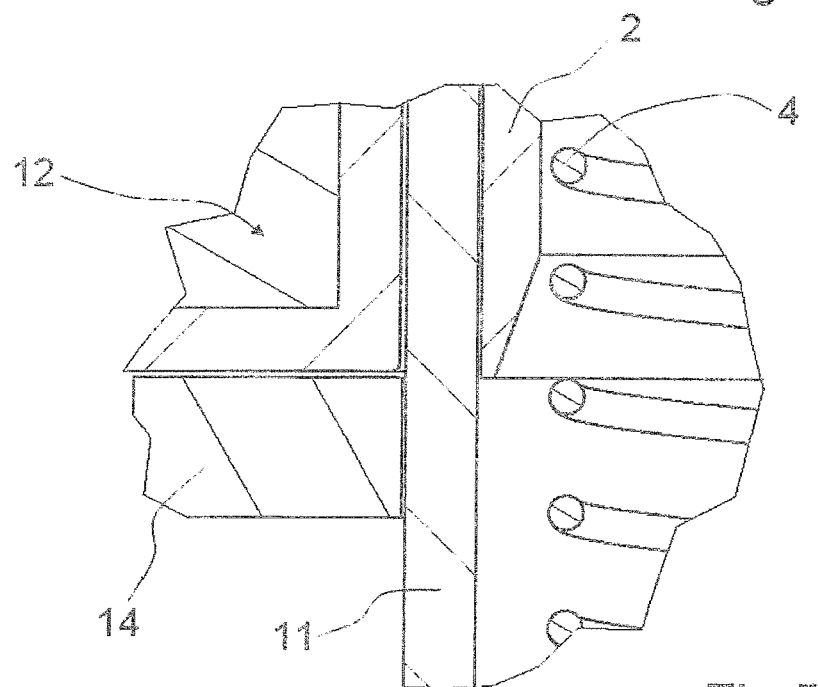
FIG. 5 shows a detail B corresponding to FIG. 1 in a partially opened position of the electronic expansion valve.
Figure 6:
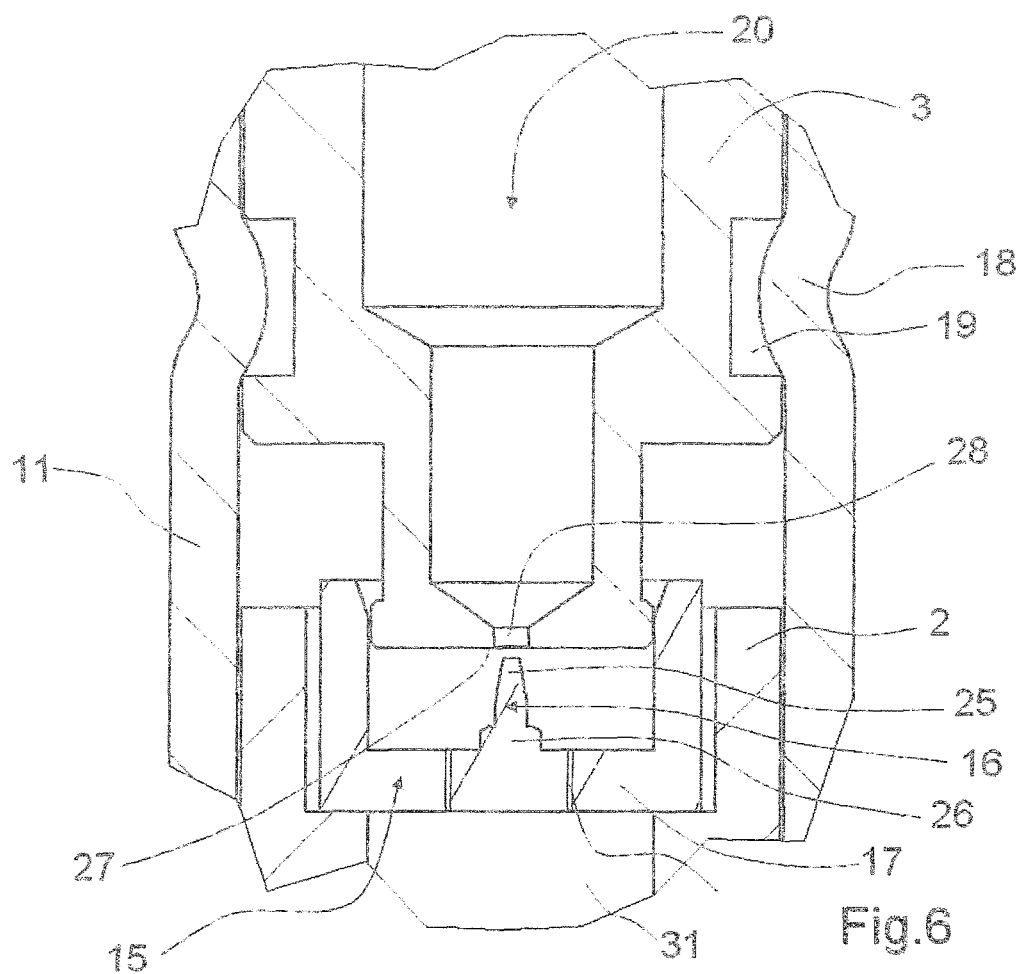
FIG. 6 shows a detail A corresponding to FIG. 1 in the fully open position of the electronic expansion valve.
Figure 7:
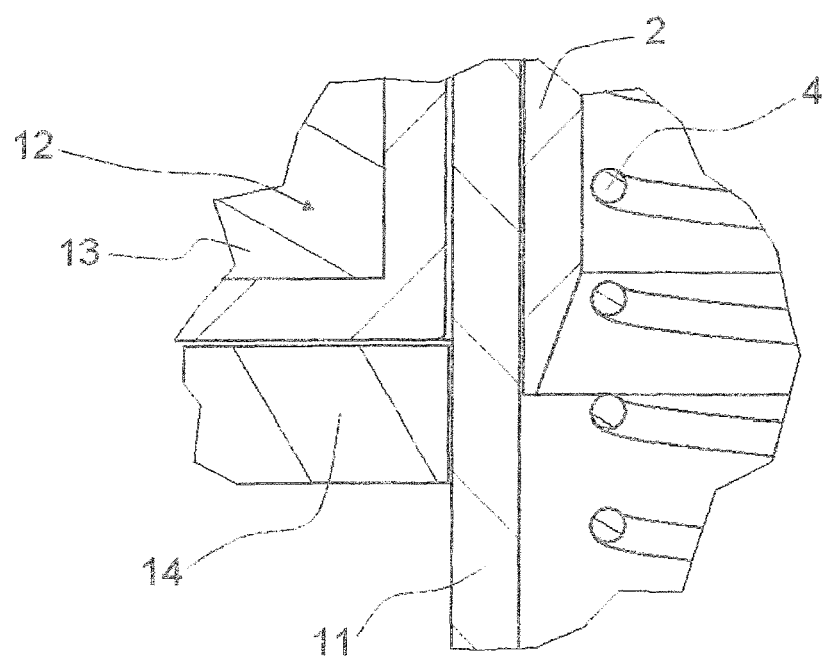
FIG. 7 shows a detail B corresponding to FIG. 1 in the fully open position of the electronic expansion valve.

The FIGS. 2 to 7 show three different opening positions of the electronic expansion valve 1. FIGS. 2 and 3 show a fully closed position of the valve, FIGS. 4 and 5 show a partially open position of the valve and FIGS. 6 and 7 show a fully open position of the valve. Therein FIGS. 2, 4 and 6 show the detail A displaying the engagement of the stop member 3 with the throttling element 15 in the three different valve positions. The FIGS. 3, 5 and 7 on the other hand show the detail B in the three different valve positions. FIGS. 3, 5 and 7 show the displacement of the armature 2 facing towards the outlet 8 relative to the solenoid coil 12. FIGS. 2, 4 and 6 in particular show the throttling element 15 in more detail.

The throttling cone 16 comprises a frusto-conical tip 25 as well as a cylindrical base 26. In the fully closed position of the electronic expansion valve 1 the cylindrical base 26 of the throttling cone 16 rests against a valve seat 27 of the stop member 3. Consequently, it is not necessary that the throttling cone 16 completely occupies an orifice 28 of the stop member 3 in the fully closed position. The cylindrical base 26 resting against the valve seat 27 will already ensure that the valve is tightly closed. The throttling element 15 is guided by the stop member 3. The throttling cone 16 can move within the orifice 28 without contact. Therefore no friction occurs and wear is avoided.

The throttling element 15 is positioned in the armature 2 with a circumferential gap so that in all cases it can be accommodated by the armature 2.

The throttling element 15 is arranged in a cylindrical bore 29 of the armature 2. The throttling element 15 furthermore comprises one or more apertures 30. Preferably two or more apertures 30 are arranged on a circle around the throttling cone 16 in radial direction.

Once the magnetic force and the differential pressure force exceed the biasing force the armature 2 is displaced away from the stop member 3 thereby opening the electronic expansion valve as depicted in FIGS. 4 to 7. Once the base 26 of the throttling cone 16 no longer fully blocks the orifice 28 fluid from the inlet 9 can pass through the orifice channel 20. Afterwards the fluid may pass the orifice 28 and enter into the apertures 30 to reach a central armature bore 31 of the armature 2.

FIG. 6 shows the fully open position of the electronic expansion valve 1, wherein the throttling cone 16 is displaced fully outside of the orifice 28. FIGS. 3, 5 and 7 show the displacement of the armature 2 relative to the solenoid coil 12. In the fully closed position of the electronic expansion valve 1 according to FIG. 3 the end of the armature 2 facing towards the outlet 8 is located inside the magnetic bracket 14 of the solenoid coil 12 in the longitudinal direction.

In FIG. 5 the end of the armature 2 facing towards the outlet 8 has been slightly displaced downwards in the direction of the outlet 8.

In the fully open position of the electronic expansion valve 1 depicted in FIG. 7 there is some overlap between the end of the armature 2 facing towards the outlet and the magnetic bracket 14 in the longitudinal direction of the electronic expansion valve 1. Since the magnetic field lines will be mostly guided by the magnetic bracket 14 an overlap in the longitudinal direction between the magnetic bracket 14 and the armature 2 will reduce the magnetic force on the armature thereby allowing a more controlled movement of the armature 2 even at high current provided to the solenoid coil.

In order to calibrate the electronic expansion valve 1 the stop member 3 is initially displaceable in the longitudinal direction of the tube 10. Preferably the solenoid coil 12 is also initially displaceable in the longitudinal direction of the tube 10.

According to a method for calibrating an electronic expansion valve according to the invention an emergency fluid pressure is provided at the inlet 9. Then the position of the stop member 3 relative to tube 10 is adjusted while the fluid flow at the outlet 8 is measured. Once the desired emergency fluid flow at the outlet 8 is measured, the longitudinal position of the stop member 3 inside the tube 10 is fixed. The stop member may preferably be fixed by plastically deforming the enlarged section 11 of the tube 10 around the stop member 3 resulting in a radial deformation 18 as seen in FIG. 1. The radial deformation 18 engages into an annular recess 19 of the stop member 3. This way the electronic expansion valve 1 also has the functionality of a pressure relief valve.

To further calibrate the electronic expansion valve 1 after fixing the position of the stop member 3, a desired fluid pressure (that is different from the emergency fluid pressure) is provided at the inlet 9. Then the solenoid coil 12 is provided with a predetermined current to displace the armature 2 by the resulting magnetic force. Afterwards the position of the solenoid coil 12 relative to the stop member 3 and/or the tube 10 is adjusted while measuring the fluid flow at the outlet 8. The solenoid coil may then be displaced in the longitudinal direction of the tube during the calibration until the correct position of the solenoid coil is found. Once a desired fluid flow at the outlet 8 is measured, the position of the solenoid coil 12 relative to the stop member 3 and/or the tube 10 is fixed. Note that the emergency fluid flow mentioned above may be different from the desired fluid flow. By these addition calibration steps the resulting electronic expansion valve 1 has a well calibrated relation between the current provided to the solenoid coil 12 and the resulting fluid flow through the expansion valve 1.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An electronic expansion valve comprising:
    an inlet, an outlet, an armature, a stop member, a biasing member and a solenoid coil,
    wherein the armature directly or indirectly rests against the stop member in the closed position of the valve,
    wherein the biasing member provides a biasing force on the armature towards a closing direction to stop a fluid flow from the inlet to the outlet,
    wherein the solenoid coil provides a magnetic force on the armature towards an opening direction to allow a fluid flow from the inlet to the outlet if the solenoid coil is provided with an electric current,
    wherein a pressure difference between the inlet pressure and the outlet pressure provides a differential pressure force on the armature towards an opening direction to allow a fluid flow from the inlet to the outlet,
    wherein the armature is displaced away from the stop member to allow a fluid flow from the inlet to the outlet at the sum of the magnetic force and the differential pressure force on the armature exceeds the biasing force, and
    wherein, the electronic expansion valve is at least partially arranged in a tube coaxially to a central tube axis.

2. An electronic expansion valve comprising:
    an inlet, an outlet, an armature, a stop member, a biasing member and a solenoid coil,
    wherein the armature directly or indirectly rests against the stop member in the closed position of the valve,
    wherein the biasing member provides a biasing force on the armature towards a closing direction to stop a fluid flow from the inlet to the outlet,
    wherein the solenoid coil provides a magnetic force on the armature towards an opening direction to allow a fluid flow from the inlet to the outlet if the solenoid coil is provided with an electric current,
    wherein a pressure difference between the inlet pressure and the outlet pressure provides a differential pressure force on the armature towards an opening direction to allow a fluid flow from the inlet to the outlet,
    wherein the armature is displaced away from the stop member to allow a fluid flow from the inlet to the outlet at the sum of the magnetic force and the differential pressure force on the armature exceeds the biasing force, and
    wherein, a throttling element is arranged between the armature and the stop member.

3. The electronic expansion valve according to claim 2, wherein, the throttling element comprises a throttling cone, that engages with the stop member in the closed position of the electronic expansion valve.

4. The electronic expansion valve according to claim 2, wherein, the throttling cone comprises a cylindrical base and a frusto-conical tip.

5. The electronic expansion valve according to claim 2, wherein the throttling element comprises a cylindrical cap, that is arranged in a cylindrical bore of the armature.

6. The electronic expansion valve according to claim 5, the throttling element is arranged in the armature with radial clearance.

7. An electronic expansion valve comprising:
    an inlet, an outlet, an armature, a stop member, a biasing member and a solenoid coil,
    wherein the armature directly or indirectly rests against the stop member in the closed position of the valve,
    wherein the biasing member provides a biasing force on the armature towards a closing direction to stop a fluid flow from the inlet to the outlet,
    wherein the solenoid coil provides a magnetic force on the armature towards an opening direction to allow a fluid flow from the inlet to the outlet if the solenoid coil is provided with an electric current,
    wherein a pressure difference between the inlet pressure and the outlet pressure provides a differential pressure force on the armature towards an opening direction to allow a fluid flow from the inlet to the outlet,
    wherein the armature is displaced away from the stop member to allow a fluid flow from the inlet to the outlet at the sum of the magnetic force and the differential pressure force on the armature exceeds the biasing force, and
    wherein the stop member comprises an orifice with a valve seat as well as an orifice channel, wherein the orifice channel is arranged between the inlet and the orifice in the direction of fluid flow.

8. The electronic expansion valve according to claim 7, wherein the throttling element is guided by the stop member so that the throttling cone is movable frictionless within the orifice.

9. A refrigeration system comprising the electronic expansion valve according to claim 1.

10. A method for calibrating an electronic expansion valve comprising an inlet, an outlet, an armature, a stop member, a biasing member and a solenoid coil, wherein the biasing member provides a biasing force on the armature towards a closing direction to stop a fluid flow from the inlet to the outlet, and wherein the solenoid coil provides a magnetic force on the armature towards an opening direction to allow a fluid flow from the inlet to the outlet if the solenoid coil is provided with an electric current, and wherein the pressure difference between the inlet pressure and the outlet pressure provides a differential pressure force on the armature towards an opening direction to allow a fluid flow from the inlet to the outlet, comprising the following steps:
    Providing a predetermined emergency fluid pressure difference from inlet to outlet,
    Adjusting the position of the stop member while measuring the fluid flow rate at the outlet, and
    Once a predetermined emergency fluid flow rate is measured, fixing the position of the stop member.

11. The method according to claim 10, wherein the additional steps:
    After fixing the position of the stop member, providing a desired fluid pressure difference from inlet to outlet,
    Providing the solenoid coil with a predetermined current to displace the armature,
    Adjusting the position of the solenoid coil relative to the stop member while measuring the fluid flow rate at the outlet, and Once a desired fluid flow rate is measured, fixing the position of the solenoid coil relative to the stop member.

12. The method according to claim 10, wherein, the armature and the stop member are arranged in a tube, wherein the stop member is displaced in the longitudinal direction of the tube before the position of the stop member is fixed relative to the tube.

13. The method according to claim 12, wherein, the position of the stop member is fixed by plastically deforming the tube around the stop member.

14. The method according to claim 12, wherein, the solenoid coil is arranged concentrically around the tube, wherein the solenoid coil is displaced in the longitudinal direction of the tube before the position of the solenoid coil is fixed relative to the stop member.

15. The electronic expansion valve according to claim 1, wherein, a throttling element is arranged between the armature and the stop member.

16. The electronic expansion valve according to claim 3, wherein, the throttling cone comprises a cylindrical base and a frusto-conical tip.

17. The electronic expansion valve according to claim 3, wherein the throttling element comprises a cylindrical cap, that is arranged in a cylindrical bore of the armature.

18. The electronic expansion valve according to claim 4, wherein the throttling element comprises a cylindrical cap, that is arranged in a cylindrical bore of the armature.

19. The electronic expansion valve according to claim 1, wherein the stop member comprises an orifice with a valve seat as well as an orifice channel, wherein the orifice channel is arranged between the inlet and the orifice in the direction of fluid flow.

20. A refrigeration system comprising the electronic expansion valve according to claim 2.

21. A refrigeration system comprising the electronic expansion valve according to claim 7.

* * * * *